United States Patent
Hsueh

(10) Patent No.: US 11,794,405 B2
(45) Date of Patent: Oct. 24, 2023

(54) 3D PRINTING WITH STATIONARY BUILD PLATFORM

(71) Applicant: Comcast Cable Communications, LLC, Philadelphia, PA (US)

(72) Inventor: Tsung-Hsiang Hsueh, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/572,017

(22) Filed: Jan. 10, 2022

(65) Prior Publication Data

US 2023/0219288 A1   Jul. 13, 2023

(51) Int. Cl.
| | |
|---|---|
| *B29C 64/129* | (2017.01) |
| *B29C 64/245* | (2017.01) |
| *B29C 64/255* | (2017.01) |
| *B33Y 30/00* | (2015.01) |
| *B29C 64/264* | (2017.01) |
| *B33Y 10/00* | (2015.01) |
| *B29C 64/321* | (2017.01) |

(52) U.S. Cl.
CPC .......... *B29C 64/129* (2017.08); *B29C 64/245* (2017.08); *B29C 64/255* (2017.08); *B29C 64/264* (2017.08); *B29C 64/321* (2017.08); *B33Y 10/00* (2014.12); *B33Y 30/00* (2014.12)

(58) Field of Classification Search
CPC ... B29C 64/124; B29C 64/129; B29C 64/135; B29C 64/321; B29C 64/329; B29C 64/336; B29C 64/343; B29C 64/245; B29C 64/255; B33Y 10/00; B33Y 30/00
See application file for complete search history.

(56) References Cited

U.S. PATENT DOCUMENTS

| | | |
|---|---|---|
| 10,710,299 B2 | 7/2020 | Chen |
| 2017/0210064 A1 | 7/2017 | Aw et al. |
| 2018/0162052 A1* | 6/2018 | Pearlson ................ B33Y 80/00 |
| 2021/0362433 A1* | 11/2021 | Enslow ................ B29C 64/393 |
| 2023/0012168 A1* | 1/2023 | Dubelman ............ B29C 64/205 |

* cited by examiner

*Primary Examiner* — Joseph S Del Sole
*Assistant Examiner* — Jamel M Nelson
(74) *Attorney, Agent, or Firm* — Banner & Witcoff, Ltd.

(57) ABSTRACT

Systems, apparatuses, and methods are described for 3D printing using a stationary build platform. Resin (e.g., a photopolymer) may be dosed into a vat in volumes required to create one layer at a time. An image projector may cure the top-most layer of the resin in the vat to create one layer at a time to fabricate a three-dimensional (3D) object from the bottom up, right side up, and/or layer-by-layer over the build plate.

20 Claims, 9 Drawing Sheets

US 11,794,405 B2

3D PRINTING WITH STATIONARY BUILD PLATFORM

BACKGROUND

Three-dimensional (3D) printing technology has revolutionized the way that prototypes, mock-ups, and even end-user products are designed and manufactured. However, 3-D printing is a slow process that has several technical challenges. One issue, for example, is that during the printing process there may be attachment and release of a printed portion from the membrane to which it is attached. These and other issues related to 3-D printing are addressed in the present disclosure.

SUMMARY

The following summary presents a simplified summary of certain features. The summary is not an extensive overview and is not intended to identify key or critical elements.

Systems, apparatuses, and methods are described for 3D printing using a stationary build plate. A device or combination of devices capable of volumetric dosing and delivery, such as a dosing pump, may be used to transport an amount of photo-sensitive resin necessary to create one layer of a 3D object to a vat, and an image projector may cure the resin one layer at a time over the stationary build platform. The dosing pump may transport an amount required to create the next layer of the 3D object to the vat, and the image projector may cure the resin to create the new layer. The newly added amount may be introduced, for example, at a bottom of the vat, to reduce surface rippling. Alternatively, the new added amount may also be introduced at other portions of the vat or similar component.

Each layer of cured resin may be formed adjacent the previous layer, for example, above or directly on top of the previous layer. In one aspect, the build platform may be disposed at the bottom surface of the vat, and the 3D object may be printed on or over the build platform. Any uncured resin may be initially stored in a reservoir, from which a transport device such as the dosing pump transport the resin to the vat.

The various operations of the dosing pump and/or the image projector may be controlled by a controller. The amount of resin to transport to the vat for each layer may be determined (e.g., by the controller) based on the dimensions of the vat and/or the thickness (e.g., height) of one layer of the 3D object to be printed. Transporting the resin to the vat by the dosing pump may be stopped based on a signal received from a sensor.

One benefit of the disclosed methods is reduction or elimination of unwanted ripples in a vat of photo-sensitive resin. Additionally, as moving parts within the vat may be reduced or eliminated, the print speed and quality may be improved. These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
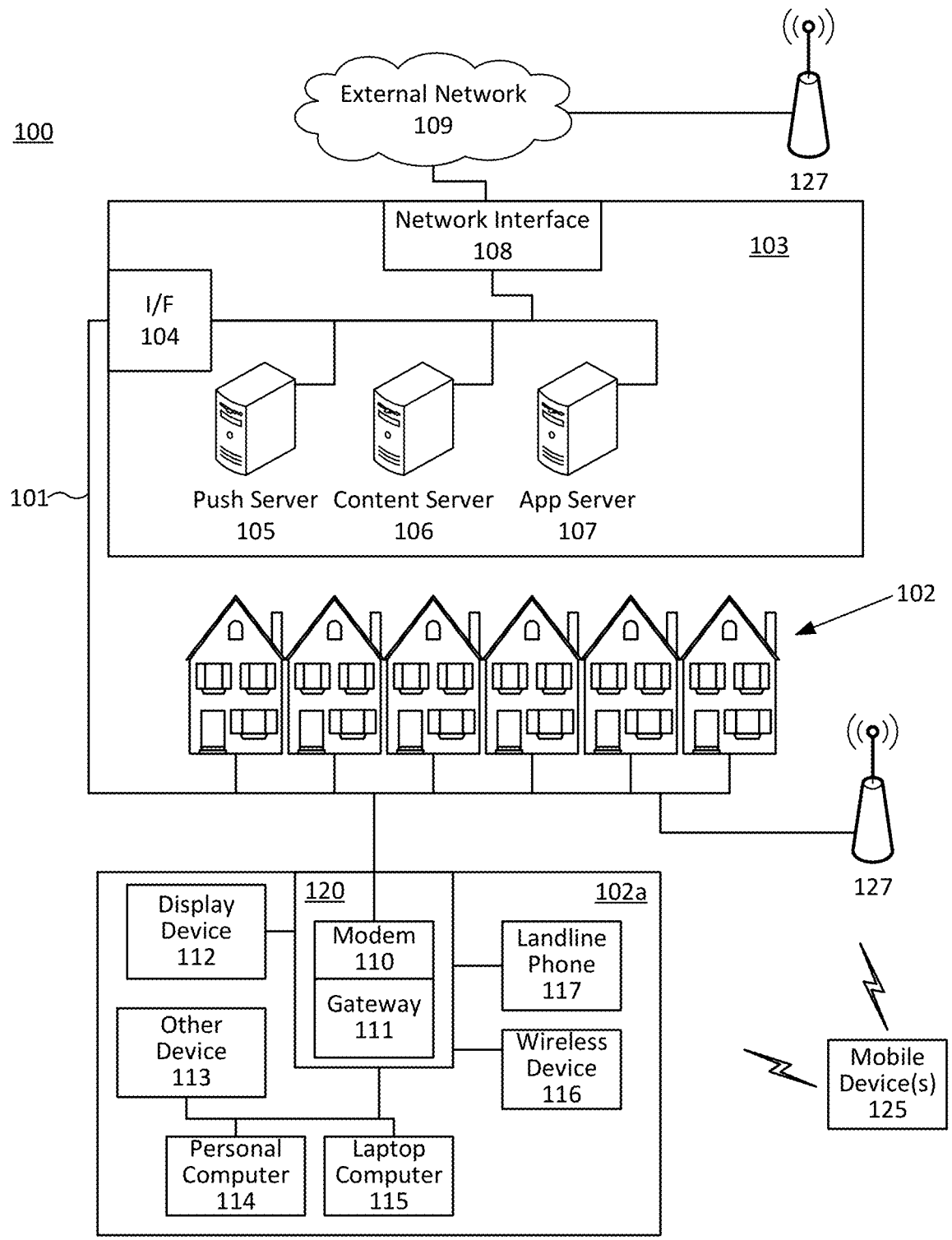
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a Wi-Fi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. An application server may be responsible for generating, collecting, and sharing of 3D models. Through the application server 107, for example, users may download or upload 3D models suitable for 3D printing. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers. Although shown separately, the push server 105, the content server 106, the application server 107, and/or other server(s) may be combined. The servers 105, 106, 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises. Other devices 113 may also include 3D printing equipment as described herein.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
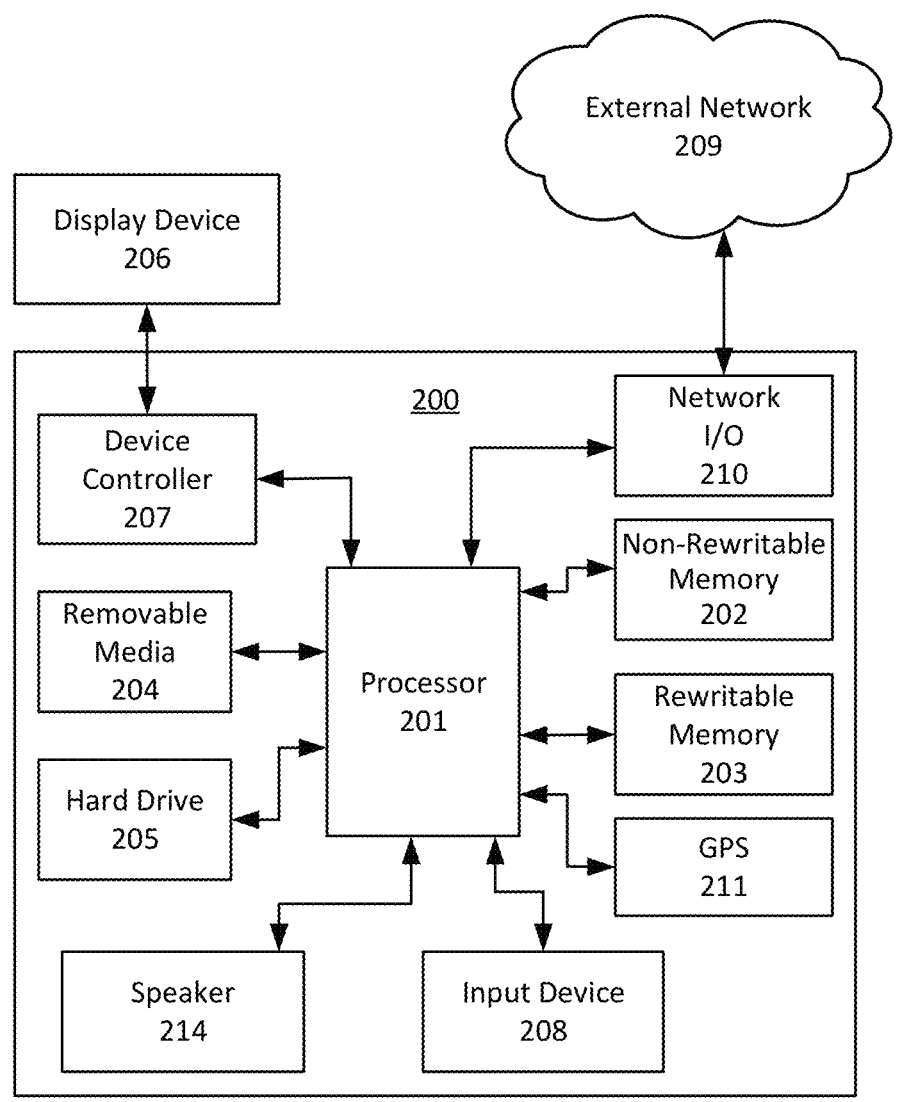
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., a 3D printing apparatus, a controller, etc.). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random-access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

The computing device 200 may also include one or more sensors for detecting a level (e.g., amount) of liquid (e.g., resin) contained in a vessel (e.g., a reservoir, a vat, etc.). The computing device 200 may further include a dosing pump and/or an image projector as described herein. The processor 201 may control various operations of the sensor(s), the dosing pump, and/or the image projector.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. A memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. An IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3A:
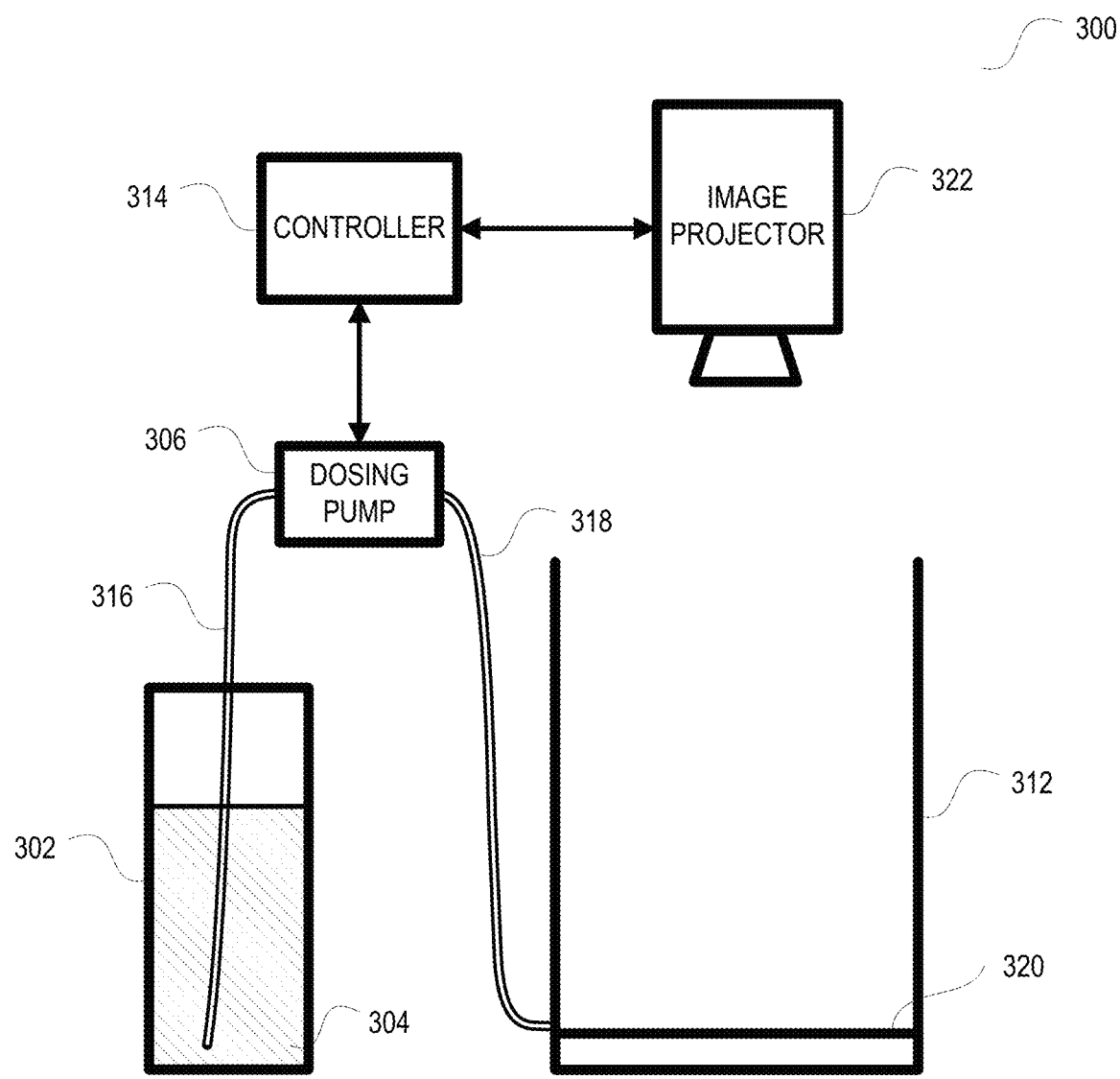
FIG. 3A shows an example 3D printing apparatus.

FIG. 3A shows an example 3D printing apparatus 300. The 3D printing apparatus (e.g., stereolithography (SLA) apparatus) 300 may be also referred to as a 3D printer, an optical fabricator, a resin printer, etc. The 3D printing apparatus 300 may include a reservoir 302, resin 304, a dosing pump 306, a vat 312, a controller 314, an intake tube 316, a discharge tube 318, a build platform 320, and/or an image projector 322. However, the 3D printing apparatus 300 may include fewer or more components than those that are shown in FIG. 3A. One or more of the components shown in FIG. 3A may be omitted or consolidated. One or more components of the 3D printing apparatus 300 may be integrated into one device, or some or all of the components may constitute two or more devices. The controller 314 may be a desktop and/or laptop personal computer (PC) that may be connected to the rest of the 3D printing apparatus 300 for controlling other components such as the dosing pump 306, the image projector 322, etc. The controller 314 may be integrated into the 3D printing apparatus 300 and housed in the same chassis as the dosing pump 306, the image projector 322, etc.

The reservoir 302 may be a vessel, a bottle, a container, and/or a tank (e.g., dosing tank) that is capable of storing or containing resin 304. The surface of the reservoir 302 may be opaque, coated, and/or tinted in order to prevent the resin 304 from being contaminated (e.g., prematurely cured via light). The reservoir 302 may be made with a material that is impervious, nonreactive, inert, and/or resistant (e.g., chemically resistant) to the resin 304, such as glass, plastic (e.g., polyethylene terephthalate, high-density polyethylene, polyvinyl chloride, low-density polyethylene, polypropylene, polystyrene, etc.), metal, etc. The resin 304 sitting in the reservoir 302 may be mechanically agitated (e.g., via a rotating stirring rod, a magnetic stirrer capsule, etc.) continuously and/or periodically to keep all the ingredients in the resin 304 fully mixed and homogeneous.

The dosing pump 306 may transport the resin 304 from the reservoir 302 to the vat 312 in precise volumes required to create each of the layers of a 3D model (e.g., 3D object). The dosing pump 306 may be any mechanical pumping device that is capable of transporting a small amount of liquid substance at a time from the reservoir 302 to the vat 312 at a particular flow rate. For example, the dosing pump 306 may be a positive displacement pump, such as a diaphragm pump, a constant injection pump, a pulse injection pump, a lobe pump, a drum pump, a flexible impeller pump, a gear pump, a metering pump, a peristaltic pump, a piston pump, a plunger pump, a screw pump, etc. The dosing pump 306 may be programmable. Operations of the dosing pump 306 may be controlled by the controller 314. Transporting of the resin 304 may be accomplished via one or more channels, such as the intake tube 316 that connects the reservoir 302 to the dosing pump 306, and the discharge tube 318 that connects the dosing pump 306 to the vat 312. The intake tube 316 and/or the discharge tube 318 may be composed of a flexible or rigid material that is impervious, nonreactive, inert, and/or resistant (e.g., chemically resistant) to the resin 304. The intake tube 316 and/or the discharge tube 318 may be opaque, coated, and/or tinted in order to prevent the resin 304 from being contaminated (e.g., prematurely cured via light). For example, the intake tube 316 and/or the discharge tube 318 may be composed of latex, glass, plastic, metal, etc. Alternatively, the intake tube 316 and/or the discharge tube 318 may be a pipe, a capillary, or a channel. As shown in FIG. 3A, the discharge tube 318 may be connected to the bottom-most portion of the side wall of the vat 312, as introduction of resin at the bottom may reduce, minimize, and/or eliminate surface ripples at the top of the resin in the vat 312. However, the discharge tube 318 may be connected to other parts of the vat 312, such as a top portion of the side wall, a middle portion of the side wall, and/or a bottom surface. The discharge tube 318 may be suspended into the vat 312. At or near the bottom of the discharge tube 318 (e.g., a nozzle), a diffusing structure may be placed to further minimize the disruption of the resin 304 inside the vat 312. The discharge tube 318 may split into two or more outlets and the resin 304 may discharge into the vat 312 through these two or more outlets to decrease the flow rate of each outlet and thereby further reducing ripples and other disturbances of the resin 304. The multiple outlets (or inlets from the perspective of the vat 312) may be distributed (e.g., evenly distributed) throughout the vat 312 (e.g., surrounding the build plate 320 or emerging from the bottom through holes in the build plate 320).

The vat 312 may be any type of vessel, tray, container, or tank that is capable of holding the resin 304, from which a 3D model may be fabricated inside the vat 312. The vat 312 may have a bottom surface and one or more side walls. The vat 312 may have an open top although it could have a removable and/or transparent lid. The vat 312 may have a cylindrical or polygonal prism shape having a uniform horizontal cross-sectional shape and/or area. The vat 312 may be composed of a material (e.g., glass, metal, plastic, etc.) that is impervious, nonreactive, inert, and/or resistant (e.g., chemically resistant) to the resin 304. The vat 312 may impede and/or block light (e.g., UV light). The size of the vat 312 may be at least as large as the 3D object to be printed.

The build platform 320 (also referred to as a build plate, a print platform, a bed, a print bed, etc.) may be disposed on the bottom surface of the vat 312. The platform 320 may be affixed to the bottom surface of the vat 312. Optionally, the platform 320 may be removable from the vat 312. For example, the build platform 320 may be magnetically or mechanically (e.g., via a catch or a latch) attached to the vat 312. The build platform 320 may be a metal (e.g., aluminum, steel, etc.) substrate but it may be made with other materials such as glass, plastic, etc. The build platform 320 may be impervious, nonreactive, inert, and/or resistant (e.g., chemically resistant) to light (UV) and/or uncured resin 304. The resin 304, once cured, may adhere to the surface of the build platform 320. While a 3D model is being fabricated over the build platform 320, the build platform 302 may be stationary and need not move either horizontally or vertically during printing. The stationary build platform may advantageously reduce, minimize and/or eliminate rippling at the top surface of the resin in the vat 312.

The resin 304 may be a viscous liquid that may harden (e.g., solidify) when exposed to light. The resin 304 may be a photopolymer or light-activated resin that undergoes photopolymerization under light (e.g., UV light). The resin 304 may include, for example, (meth)acrylate monomers/oligomers, such as benzil ketals, camphorquinones, benzophenones, thioxanthones, etc. The resin 304 need not be restricted to UV-cured resin but it can be any radiation-activated material suitable for layer-by-layer liquid printing. For example, the resin 304 may be cured by one or more of visible light, ultraviolet light, infrared light, laser (e.g., deep-blue polymerization laser, UV laser, etc.), X-ray, and/or other types of light. The light may be emitted by an imaging device, such as the image projector 322. The image projector 322 (also referred to as a light projector, a light emitter, an imaging device, etc.) may be, for example, a digital light processing (DLP) projector. The image projector 322 may use light masking (e.g., UV light masking) via a liquid crystal display (LCD) screen. The image projector 322 may draw dots and/or lines with laser (e.g., UV laser). As shown in FIG. 3A, the image projector 322 may project light vertically from top to bottom. However, other configurations may be also possible, including, for example, the image projector 322 emitting light from a different angle and/or using one or more light reflectors. The image projector 322 may be capable of focusing its light (e.g., visible light, ultraviolet light, infrared light, laser, X-ray, etc.) onto one or more spots at a specified height over the build platform 320. The image projector 322 may cure the resin 304 layer-by-layer to fabricate a 3D object.

The controller 314 may be, for example, a processor, a central processing unit (CPU), a graphics processing unit (GPU), an accelerated processing unit (APU), a digital signal processor (DSP), an application processor (AP), an application-specific integrated circuit (ASIC), a field-programmable gate arrays (FPGA), and/or the like. The controller 314 may include other components as well. The controller 314 may be, for example, a personal computer 114, a laptop computer 115, other device 113, a wireless device 116, and/or a mobile device 125 as shown in FIG. 1; or a computing device 200 as shown in FIG. 2. The controller 315 may be, for example, a computer, a desktop computer, a laptop computer, a mobile device, a personal digital assistant (PDA), a smartphone, a tablet PC, and/or the like. The controller 314 may control the operations of one or more other components of the 3D printing apparatus 300. The controller 314 may control the dosing pump 306 to transport a specific amount (e.g., corresponding to one layer of a 3D model) of the resin 304 from the reservoir 302 to the vat 312. The controller 314 may control the image projector 322 to emit focused light to one or more positions on or over the build platform 320. The controller 314 may include or be connected to software that is capable of modeling and/or manipulating digital 3D objects. For example, the software may be 3D modeling software such as computer-aided design (CAD) software. The software may include a slicer, which helps executing a 3D print by taking a 3D model and slicing it into layers. The slicer may turn the 3D model data into computer numerical control (CNC) programming language code, such as G-code.

Notably, the 3D printing apparatus 300 need not require a membrane to be placed at the bottom surface of the vat 312 because the image projector 322 is located above the vat 312 and is designed to emit light down from above rather than emit light up from below the vat 312 through a transparent window.

Figure 3B:
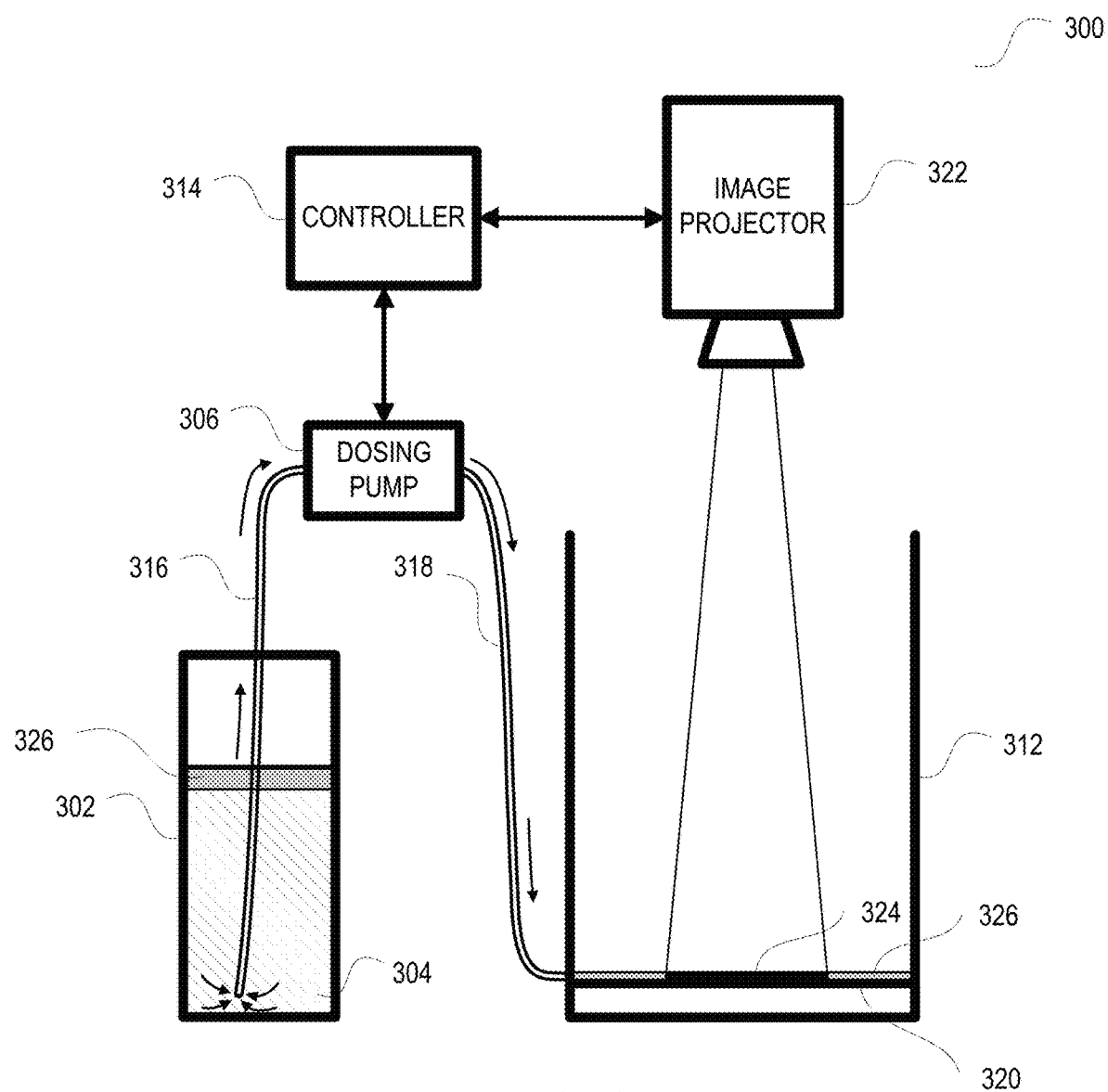
FIG. 3B shows an example 3D printing apparatus printing a first layer of a three-dimensional model.

FIG. 3B shows an example 3D printing apparatus 300 printing a first layer 324 of a three-dimensional model. Various components shown in FIG. 3B may correspond to respective components of like reference numbers as shown in FIG. 3A. The controller 314 may cause the dosing pump 306 to transport (e.g., transfer) the resin 316 from the reservoir 302 to the vat 312 in precise volumes. Specifically, the dosing pump 306 may transport the exact volume (e.g., amount) 326 of the resin 304 that is needed to create the first layer 324 of the 3D model. The volume 326 may correspond to the area of the horizontal cross-section of the vat 312 multiplied by the height of the first layer 324. The controller 314 may calculate the volume 326 based on, for example, the dimensions (e.g., length, width, radius, etc.) of the vat 312 and/or the height of the first layer 324. For example, if the vat 312 has a rectangular shape as its cross-section, the controller 314 may determine that the volume 326 of the resin 304 needed to create the first layer 324 of the 3D object is the length of the vat 312 multiplied by the width of the vat 312 multiplied by the height of the first layer 324. The height of the first layer 324 may be determined by the resolution (e.g., voxel size, Z resolution, etc.) of the 3D printing apparatus 300. For example, the height of one layer 324 may range anywhere from 10 to 200 microns although a height that is smaller or larger than the suggested range may be also possible. After the controller 314 causes the dosing pump 306 to initiate transporting the resin 304, the controller 314 may determine that the prescribed (e.g., predetermined) volume 326 of the resin 304 has been transported to the vat 312, at which time, the controller 314 may terminate the transport operation of the dosing pump 306 and prevent the dosing pump 306 from transporting any more resin 304. Alternatively, instead of calculating the exact volume 326 of the resin 304 to be transported, the controller 314 may receive a measurement from one or more sensors that measure the height of the resin 304 in the reservoir 302 and/or the vat 312. The sensor(s) may be placed at or near the reservoir 302 and/or the vat 312. For example, after the controller 314 causes the dosing pump 306 to initiate transporting the resin 304, the controller 314 may determine that the level of the resin 304 inside the vat 312 has risen by the specified height of the first layer 324, at which time, the controller 314 may terminate the transport operation of the dosing pump 306 and prevent the dosing pump 306 from transporting any more resin 304.

After the prescribed volume 326 of resin 304 has been transported to the vat 312, the controller 314 may cause the image projector 322 to illuminate (e.g., emit light on) the uncured resin 304 inside the vat 312 for a prescribed amount of time (e.g., amount of time needed to cure the resin 304 to create one layer 324 of 3D object). Specifically, the controller 314 may use image data (e.g., CNC data, G-code data, etc.) to cause the image projector 322 to illuminate the uncured resin 304 according to a pattern corresponding to the first layer (e.g., the bottom-most layer) of the 3D object to be printed. The image projector 322 may illuminate the first layer 324 by laser drawing, DLP, LCD masking, or any other suitable method. The cured resin 304 may be hardened (e.g., solidified) to form the first layer 324 of the 3D object. The cured first layer 324 of the 3D object may adhere to the top surface of the build plate 320.

Figure 3C:
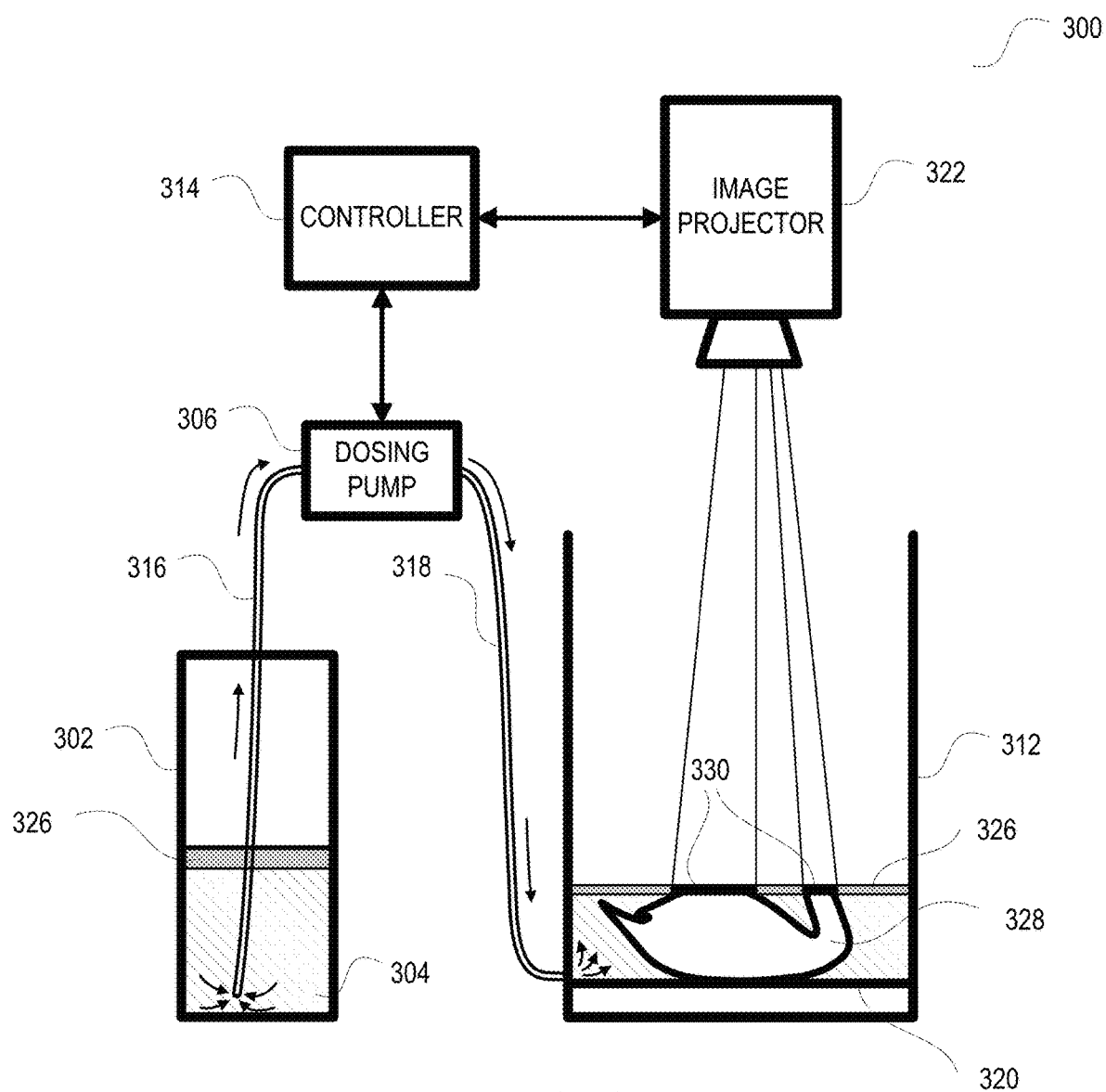
FIG. 3C shows an example 3D printing apparatus after printing one or more layers of a three-dimensional model.

FIG. 3C shows an example 3D printing apparatus 300 after printing one or more layers 330 of a three-dimensional model 328. Various components shown in FIG. 3C may correspond to respective components of like reference numbers as shown in FIG. 3A and/or FIG. 3B. The process as described with reference to FIG. 3B for printing the first layer 324 of the 3D object may be repeated for each layer until the 3D object 328 is fully formed. Specifically, each new layer, such as a layer 330, may be cured on top of the previous layer. In this way, the 3D object 328 may be formed one layer at a time, right side up, and bottom-up.

The controller 314 may control the dosing pump 306 to transport (e.g., transfer) a prescribed amount or volume 326 (e.g., an amount needed to create one layer of the 3D object 328) of the resin 304 from the reservoir 302 to the vat 312. The resin 304 may be injected, via the discharge tube 318 to, for example, a bottom portion of a side wall of the vat 312. By injecting the resin 304 at a site far from the top surface of the resin 304 (e.g., the new layer 330), disturbance (e.g., ripples, waves, vibrations, etc.) to the new layer 330 may be reduced, minimized, and/or eliminated. This may reduce the time it takes to cure the new layer 330 because the uncured new layer 330 does not need to settle (e.g., stabilize) before the light curing process begins, or at least it takes a shorter time for the uncured new layer 330 to settle. The resin 304 may be dosed into the vat 312 in a manner that keeps a constant height of uncured resin 304 above the 3D object 328 being printed. The height may be equal to the thickness of a single print layer (e.g., voxel height, Z resolution, etc.). The volume of the new uncured layer of the resin 304 may be equal to the lateral surface area (e.g., horizontal cross-sectional area inside the side wall(s)) of the vat 312 multiplied by the layer thickness (e.g., height).

After and/or while the resin 304 is transported, the controller 314 may control the image projector 322 to emit (e.g., optically project) light (e.g., UV light) into the vat 312, according to the horizontal cross-sectional pattern of the new layer 330 of the 3D object 328 to cure the layer 330. The newly created layer 330 of the 3D object 328, once cured, may adhere to the previous layer (e.g., one layer below) and become part of the 3D object 328 being fabricated.

As the printing process progresses, for each additional layer, more resin 304 may be dosed into the vat 312, thereby creating a continuous manufacturing process. The focus distance of the light projected from the image projector 322 may be adjusted at each layer to always remain in focus on the top layer 330 of the resin 304 surface in the vat 312. The image projector 322 may be on standby while waiting for the prescribed volume 326 of resin 304 (e.g., corresponding to one layer of the 3D model 328) to be transported to the vat 312 and then start the light curing process. Alternatively, the transporting of the resin 304 and the light curing process may be performed concurrently by constantly and/or continuously emitting dynamically changing light patterns and adjusting the focus distance of the image projector 322 as the level of the resin 304 rises at a constant flow rate.

Figure 3D:
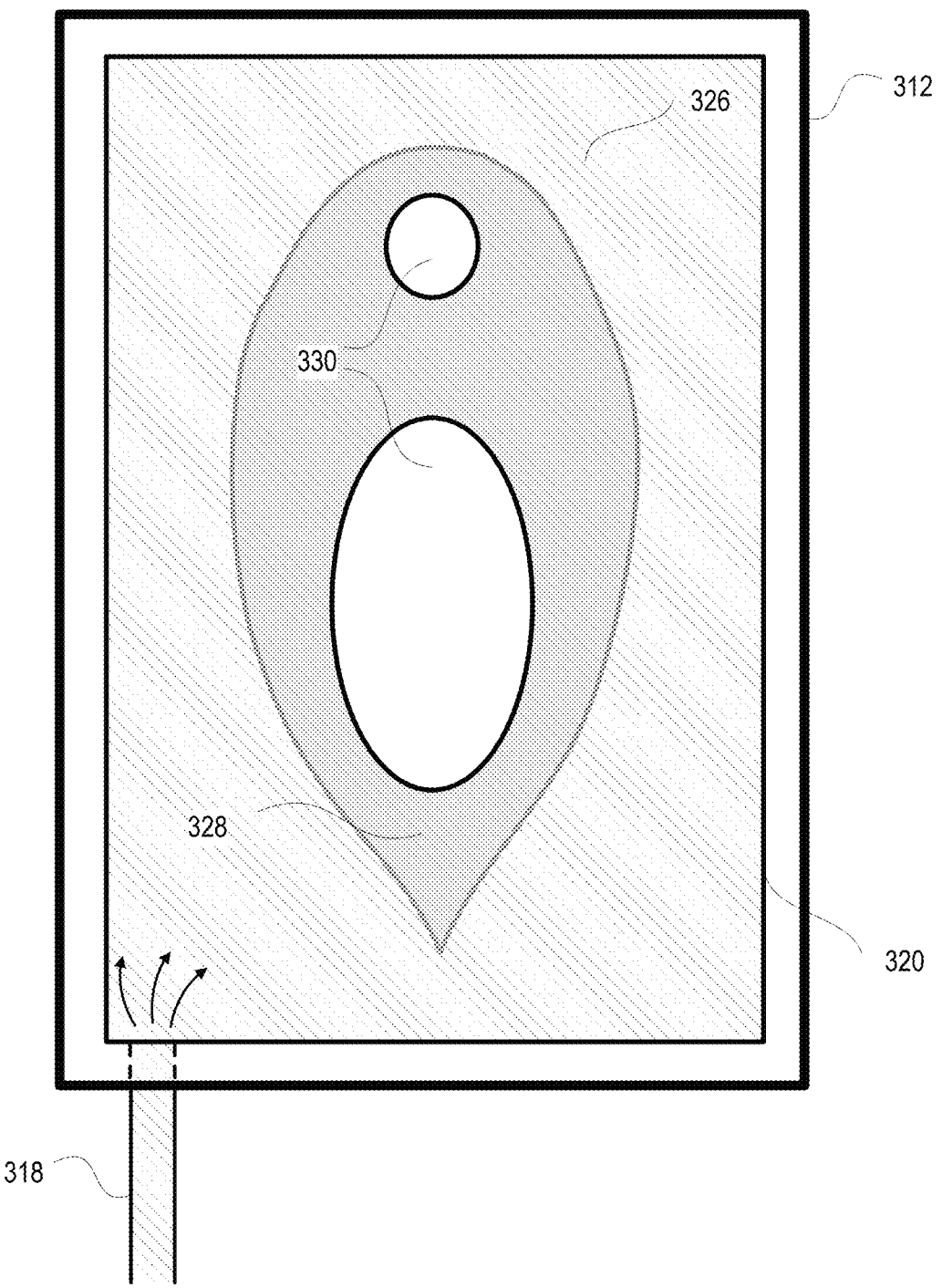
FIG. 3D shows an example 3D printing apparatus printing a last layer of a three-dimensional model.

FIG. 3D shows a top-down view of an example 3D printing apparatus 300 after printing one or more layers 330 of a three-dimensional model 328. Various components shown in FIG. 3D may correspond to respective components of like reference numbers as shown in FIG. 3C. The current layer 330 of the 3D model 328 as shown in FIG. 3D may correspond to the layer 330 as shown in FIG. 3C but viewed from the top. In this example shown in FIG. 3D, the vat 312 and the build platform 320 are rectangular in shape, but the vat 312 and/or the build platform 320 may have any other shape (e.g., circular, oval, etc.). In order to create the layer 330 of the 3D model 328, the image projector 322 may emit light (e.g., via laser drawing, DLP, LCD masking, etc.) according to the two-dimensional shape(s) of the layer 330. Notably, the layer 330 may represent a cross-sectional image of the 3D object 328. After the current layer 330 is cured, additional resin 303 may be transported to the vat 312 so that the top surface of the resin 303 would rise within the vat 312 by a prescribed height.

Figure 3E:
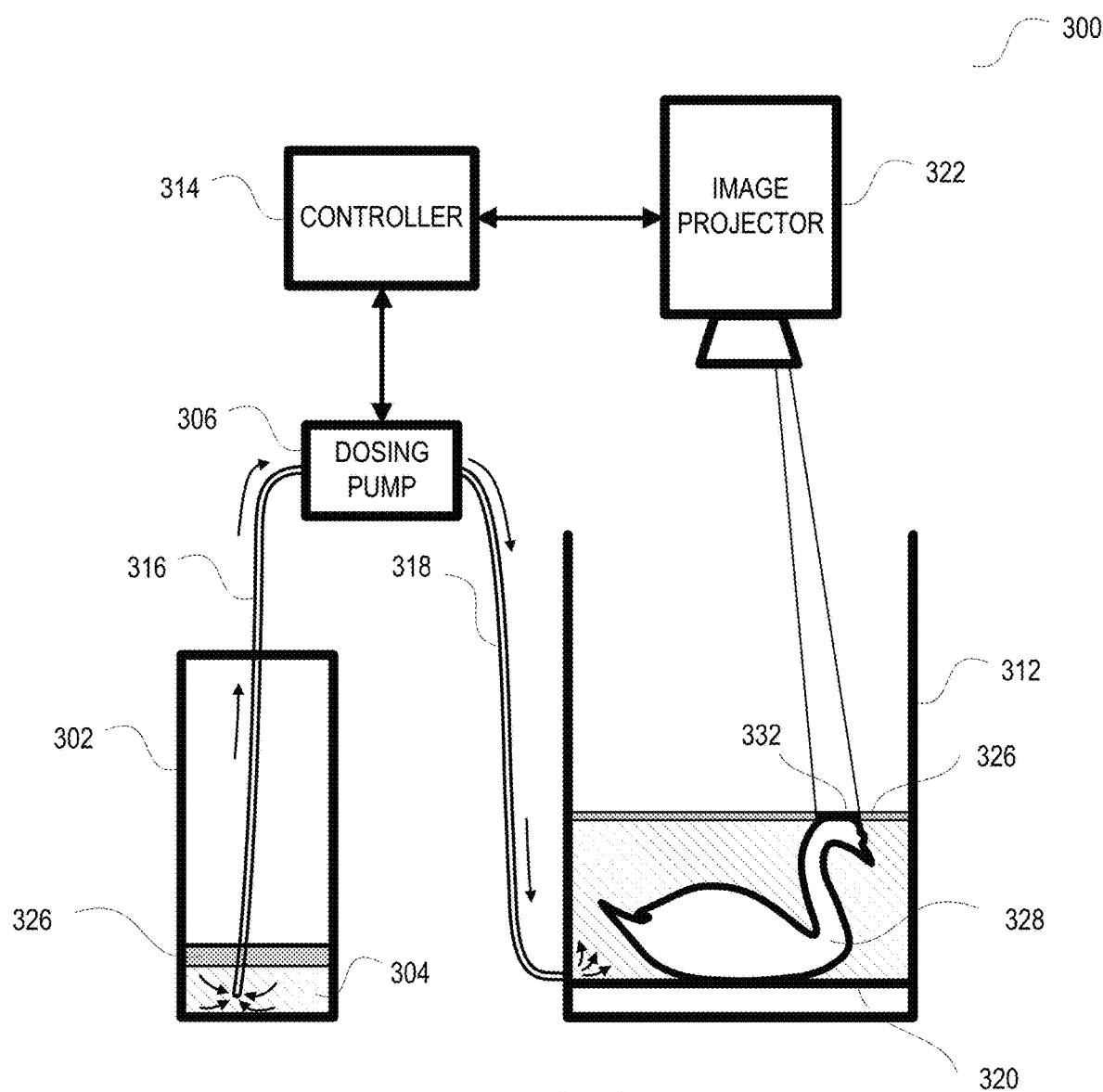
FIG. 3E shows a top-down view of an example 3D printing apparatus after printing one or more layers of a three-dimensional model.

FIG. 3E shows an example 3D printing apparatus 300 printing a last layer 332 of a three-dimensional model 328. Various components shown in FIG. 3E may correspond to respective components of like reference numbers as shown in FIG. 3A, FIG. 3B, and/or FIG. 3E. The process as described with reference to FIGS. 3B-3C for printing the first layer 324 and one or more subsequent layers 330 of the 3D object 328 may be repeated until the 3D object 328 is fully formed. Specifically, the last layer 332 of the 3D object 328 may be printed in a similar manner as the one described with reference to one or more of the previous layers. The last layer 332 may be created on top of (e.g., on, over, etc.) the previous layer (e.g., a layer below the last layer 332) of the 3D object 328. Specifically, the prescribed volume 326 of the resin 304 may be transported, via the dosing pump 306, to the vat 312, and the image projector 322 may emit light to cure the last layer 332 of the 3D object 328. After the 3D object 328 is fully formed and cured, the uncured resin 304 inside the vat 312 may be drained or otherwise removed. The leftover uncured resin 304 may be reused and/or recycled for a later project (e.g., returned to the reservoir 302). The finished 3D object may be removed from the build plate 320 through mechanical means.

The 3D printing apparatus 300 as disclosed herein does not require a fluorinated ethylene propylene (FEP) film or membrane that is required by conventional 3D printing equipment. Compared to existing methods and devices, the 3D printing apparatus 300 enables faster and more precise printing due to the lack of movement in the vat 312, the build platform 320, and the 3D object 328 during printing operation. The 3D printing apparatus 300 may also be able to achieve higher quality of printed object by reducing, minimizing, and/or eliminating sources of vibration. Because the vat 312 in the 3D printing apparatus 300 is stationary (e.g., immobile) and thus has increased robustness and stability, any mechanical vibration of uncured resin may be greatly reduced or reduced altogether. The 3D printing apparatus 300 may also have a higher success rate of producing 3D objects because the 3D printing apparatus 300 does not require that the 3D object 328 be constantly detached from the build platform 320 after curing each layer and there is little to no risk of the 3D object 328 detaching from the build platform 320 due to gravity. Because of the right side up printing of the 3D object 328 in the 3D printing apparatus 300, the maximum size and/or weight of the printable object may be larger than it would have been with a traditional device because the 3D object need not adhere to the bottom surface of the build platform upside down. Because the resin 304 is dosed layer-by-layer only when needed, the chance of the resin 304 getting spoiled due to premature exposure to light (e.g., UV light) may be reduced.

Figure 4:
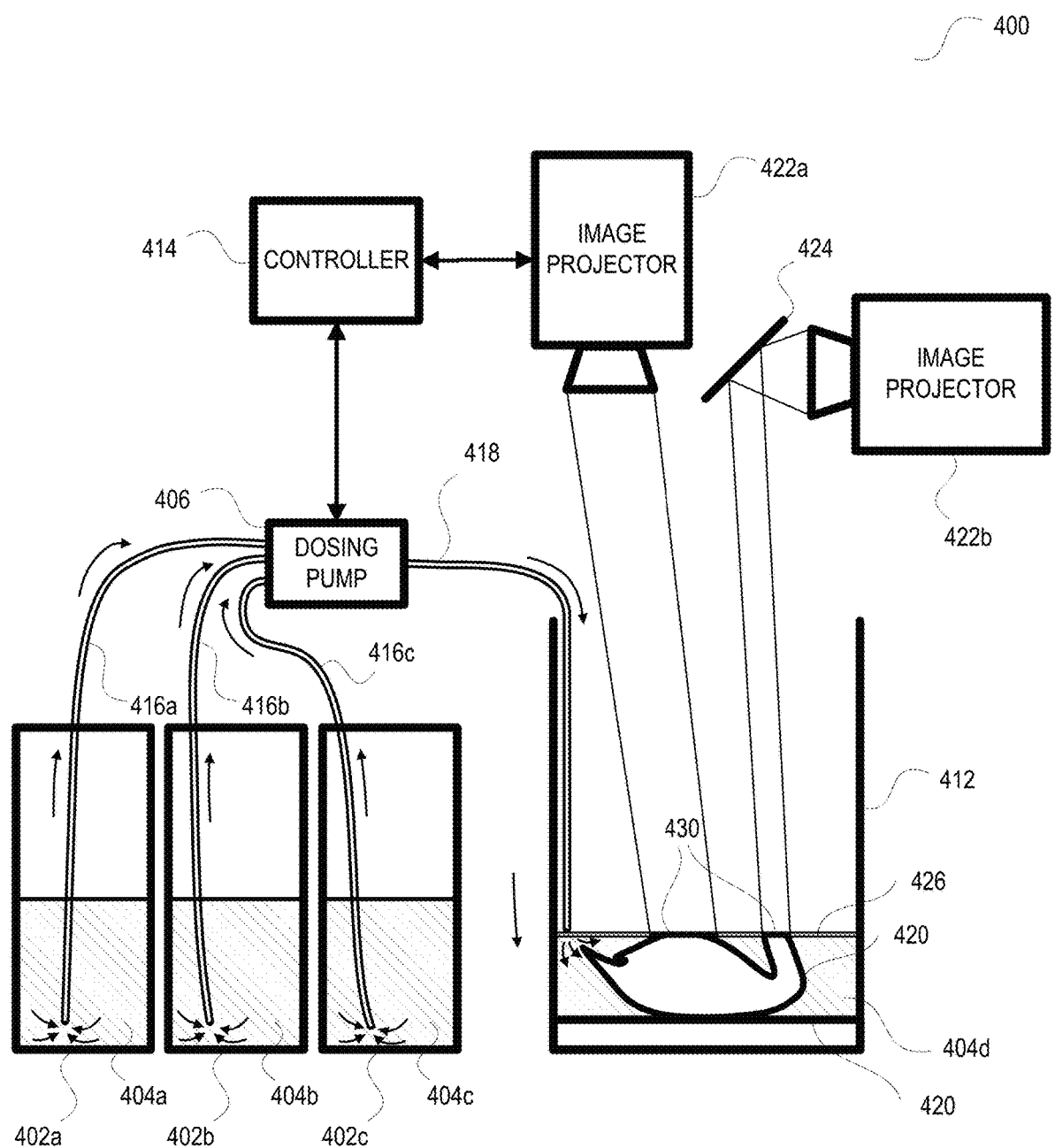
FIG. 4 shows an example 3D printing apparatus with additional components.

FIG. 4 shows an example 3D printing apparatus 400 with additional components. Various components shown in FIG. 4 may correspond to similar components as shown in FIGS. 3A, 3B, 3C, 3D, and/or FIG. 3E. The descriptions pertaining to the components as shown in FIGS. 3A-3E may apply to the same or similar components shown in FIG. 4 unless noted otherwise.

The 3D printing apparatus 400 may have two or more reservoirs, for example, reservoirs 402a, 402b, 402c (collectively 402) that supply resin 404a, 404b, 404c (collectively 404) to a vat 412 via a dosing pump 406. The multiple reservoirs 402 may be of the uniform shape and/or size or have different shapes and/or sizes. The reservoirs 402 may each contain different types of resin 404. The resin 404a, 404b, 404c in different reservoirs 402 may have different consistency, viscosity, density, hue, etc. One or more of the reservoirs 402 may also contain a substance other than the resin 404 (e.g., a dye, a liquid, an additive, etc.) to be added to the admixture of resin 404 to change its property (e.g., consistency, viscosity, hue, density, etc.). A controller 414 may controller the dosing pump 406 to mix the different types of resin 404 and/or other substance(s) with one or more mixing ratios depending on the needs of the 3D printing apparatus 400 and/or the types of 3D objects 420 to be fabricated. For example, the resin 404a, 404b, 404c may be each colored red, blue, and green, or four different types of resin 404 contained in four different reservoirs 402 may be dyed cyan, magenta, yellow, and black such that different colors of a resin mixture 404d may be injected into the vat 412. The dosing pump 406 may include a mechanical agitator (e.g., a mixer, a stirrer, a shaker, etc.) that mixes the different ingredients (e.g., resin 404a, 404b, 404c) into a uniform, consistent, and/or homogeneous mixture 404d.

The resin mixture 404d may be discharged into the vat 412 via the discharge tube 418 at or near the top surface of the resin 404 stored in the vat 412 such that the latest layer 426 of mixture (e.g., with different consistency, viscosity, hue, density, etc.) can be added on top of the existing resin 404d (e.g., rather than injected near or at the bottom of the vat 412) and the new layer 430 of the 3D object 420 may be created with the latest layer 426 of mixture. By varying the density, consistency, and/or viscosity of the subsequent mixtures, different mixtures can be laid on top of each other and stay separated without being mixed together, at least, for example, until the newest layer is being cured.

The length of the discharge tube 418 being suspended and/or inserted into the vat 412 may be dynamically adjusted (e.g., via the controller 414 and further via a mechanical means such as a spool and/or a motor) such that its tip (e.g., nozzle) may stay near or at the surface level of the top-most layer 426 of the resin 404d. The discharge tube 418 may be continuously shortened as the level of the resin 404d inside the vat 412 rises such that any disturbance (e.g., ripples, waves, vibrations, etc.) to the top-most surface 426 of the resin 404d may be reduced, minimized, or eliminated. The controller 414 may also control (e.g., reduce) the flow rate of the dosing pump 406 to reduce, minimize, or eliminate the aforementioned disturbance to the surface 426.

The 3D printing apparatus 400 may have two or more dosing pumps rather than the one dosing pump 406 as shown in FIG. 4. One or more of the reservoirs 402 may have their own dedicated dosing pumps and/or discharge tubes. The two or more discharge tubes may fee directly into the vat 412 or, optionally, into a separate agitator (e.g., a mixer, a stirrer, a shaker, etc.) that can mix the ingredients into the resin mixture 404d before feeding the mixture 404d into the vat 412. One or more dosing pumps may be coupled with a temperature control mechanism (e.g., a heating element, a cooler, etc.) and/or a temperature sensor to ensure ideal temperature of the resin mixture 404d. The temperature control mechanism and/or the temperature sensor(s) may be controlled by the controller 414.

The 3D printing apparatus 400 may have two more image projectors 422a, 422b (collectively 422) that can work in concert to emit light in complex patterns. Having multiple image projectors 422 may allow the 3D printing apparatus 400 to cure the layer 430 of resin 404d faster and/or more precisely. Having multiple image projectors 422 may allow the 3D printing apparatus 400 to fabricate a 3D model 420 that may be too large to create with a fewer number of image projectors. One or more image projectors 422 may be mounted in a different direction or orientation, and/or may utilize stationary or moveable reflector mirror(s) 424 to redirect light from various angles. One or more image projectors 422 may be equipped with refractive (e.g., focusing image via an adjustable lens mechanism) or reflective (e.g., focusing image via one or more mirrors) lens(es). Different types (e.g., spot laser, DLP, LCD masking, etc.) of image projectors 422 may be combined to project a single 2D image over the build platform 420 for curing the resin 404d.

The 3D printing apparatus 400 may have one or more sensors for detecting any ripples or other disturbances at the top surface of the surface of the resin 404d. The sensor(s) may send measurement data to the controller 414, and the controller 414 may control the image projector(s) 422 to emit light after the resin 404d has sufficiently settled and the ripples and/or other disturbances are below a threshold level.

Any one or more of the components shown in FIGS. 3A-3E and 4 may be combined in any configuration. For example, an 3D printing apparatus may have multiple reservoirs 402 of resin but only one image projector 322. In another example, an 3D printing apparatus may have one reservoir 302 and multiple image projectors 422. Other configurations are also possible, including a different number of dosing pumps, different placements of the discharge tube, different shapes of the vat and/or the build plate, etc.

Figure 5:
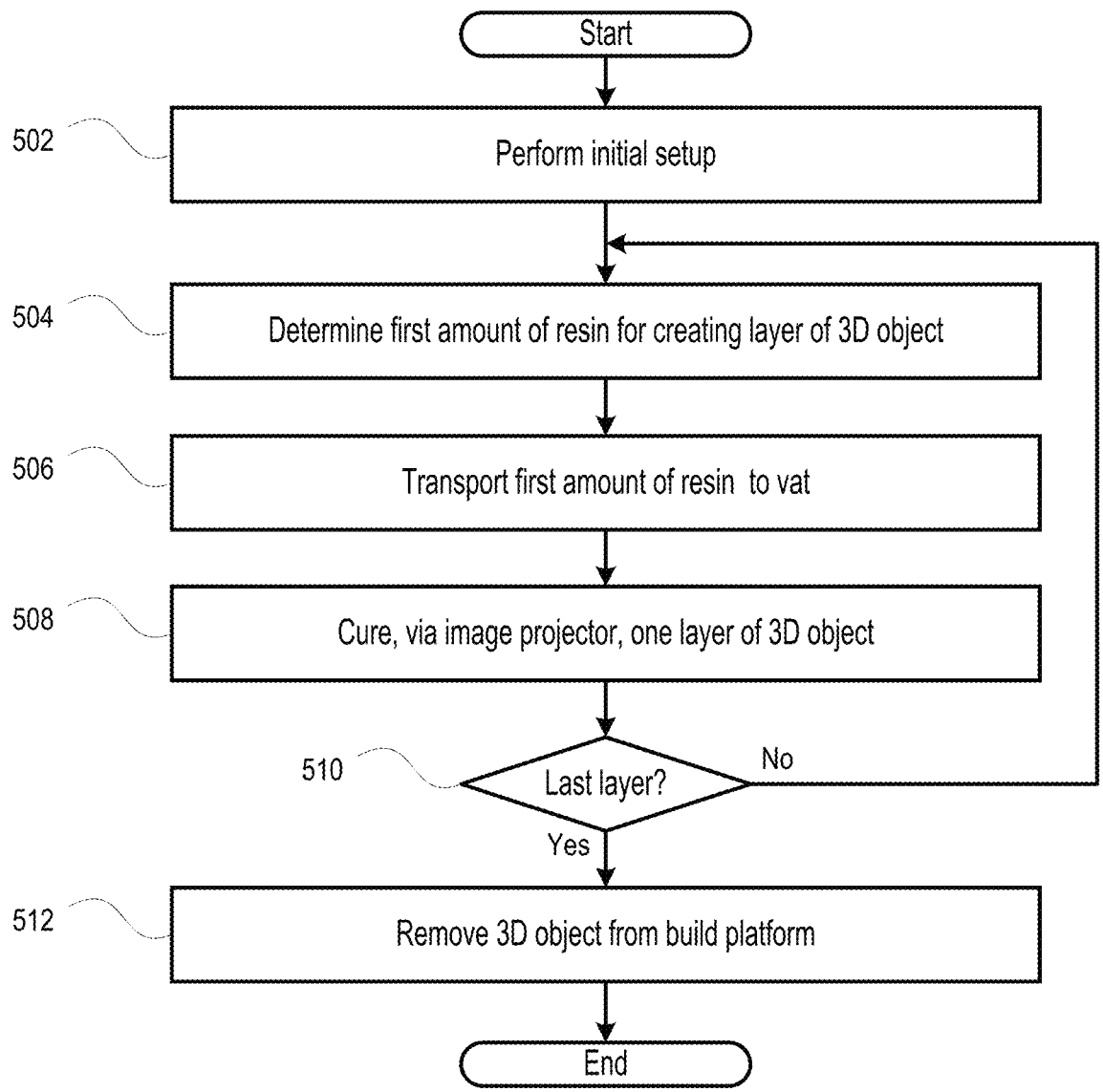
FIG. 5 is a flow chart showing an example method for 3D printing with a stationary build platform.

Having disclosed some basic system components and concepts, FIG. 5 shows a method or algorithm that may be performed to implement various features described herein. For the sake of clarity, the method is described in terms of an example 3D printing apparatus 300 and its components as shown in FIG. 3A-3E configured to practice the method or algorithm. Additionally, the 3D printing apparatus 400 as shown in FIG. 4 or any combination of components shown in FIGS. 3A-3E and 4 may be used to perform any of the steps disclosed herein. The steps outlined herein are presented as an example and can be implemented in any order and in any combination thereof, including combinations that exclude, add, or modify certain steps.

FIG. 5 is a flow chart showing an example method for 3D printing with a stationary build platform. The algorithm shown in FIG. 5 may be performed by any one or more of the devices and/or components thereof described herein. At step 502, an initial setup may be performed. The dimensions of the vat 312 may be determined. The dimensions may be entered via a user input and/or retrieved from a database. The type(s) of resin 304 being used may be determined. A digital version (e.g., a file) of the 3D object to be printed may be loaded on to the 3D printer. Other preferences and/or parameters may be set.

At step 504, a first amount of resin 304 for creating a layer of a 3D object (e.g., a 3D model) may be determined. The first amount (e.g., volume) may correspond to the area of the horizontal cross-section of the vat 312 multiplied by the height of the layer. The first amount may be determined based on, for example, the dimensions (e.g., length, width, radius, etc.) of the vat 312 and/or the height of the layer. For example, if the vat 312 has a rectangular shape as its cross-section, the first amount of resin 304 needed to create the layer of the 3D object may be the length of the vat 312 multiplied by the width of the vat 312 multiplied by the height of the layer. The height of the layer may be determined by the resolution (e.g., voxel size, Z resolution, etc.) of the 3D printing apparatus.

At step 506, a first amount of resin 304 may be transported to a vat 312. The first amount of resin 304 may be transported via a dosing pump 306. The first amount may be for creating a layer of a 3D object (e.g., a 3D model). The reservoir may store uncured resin 304 prior to being transported to the vat 312. Transporting the resin 304 from the reservoir to the vat 312 may be performed by the dosing pump 306 and controlled by a controller. The first amount of resin 304 may raise the level of resin 304 in the vat 312 by a height corresponding to one layer of the 3D object. The first amount may be determined based on dimensions of the vat 312 and/or thickness of one layer of the 3D object. Transporting the first amount of resin 304 to the vat 312 may be accomplished by initiating the dosing pump 306 to transport the resin 304 to the vat 312, and based on receiving, from a sensor, a signal indicating that a height of the resin 304 in the vat 312 has increased by a thickness of the first layer, stopping the dosing pump 306 from transporting any additional resin 304 to the vat 312. The sensor may detect the level (e.g., height, amount, etc.) of the resin 304 contained in the vat 312.

At step 508, one layer of 3D object may be cured (e.g., by the image projector 322). The layer of 3D object may be cured over a build platform. The image projector 322 may be a DLP imaging device. The image projector 322 may project light (e.g., focused light) based on laser, DLP, light masking, LCD screening, etc. The vat 312 may have a bottom surface, and the build platform may be disposed at the bottom surface of the vat 312. Curing the layer (e.g., the top-most layer at the moment) of the 3D object may include projecting, via the image projector 322, light onto a top surface of the resin 304 in the vat 312. Curing the layer (e.g., the top-most layer at the moment) of the 3D object may include projecting, via the image projector 322, visible light, ultraviolet light, infrared light, laser, and/or X-ray. The projected image or light by the image projector 322 may follow a pattern (e.g., cross-sectional image) corresponding to the appropriate layer of the 3D object. The image projector 322 may emit light onto the top-most layer of the uncured resin 304 in the vat 312 for at least a prescribed (e.g., predetermined) amount of time necessary to cure one layer of the 3D object. The amount of time may be adjustable (e.g., based on sensor readings indicating that the height of the resin 304 in the vat 312 has increased by a prescribed amount such as a height of one layer).

At step 510, it may be determined whether or not the layer of the 3D object most recently cured is the last layer (e.g., the top-most layer overall) of the 3D object. If the most recently cured layer was not the last layer (510: No), meaning that there are one or more additional layers to be printed still, the process may return to step 504. At step 504, for example, a second amount of the resin 304 may be determined, and at step 506, a second amount of the resin 304 may be transported to the vat 312 (e.g., via the dosing pump 306) for creating a next layer (e.g., a second layer) of the 3D object. The second amount may be the same as or different from the first amount. At step 508, the next layer (e.g., a second layer) of the 3D object may be cured (e.g., by the image projector 322) over the build platform. The next layer may be created on top of (e.g., directly on top of) the previous layer (e.g., the first layer). Steps 504, 506, and 508 may be repeated as needed to generate each layer of the 3D object until the 3D object is fully formed. At least parts or all of steps 504, 506, and 508 may be performed concurrently. For example, a layer of the 3D object may be cured while the resin 304 is being transported to the vat 312. After (e.g., as soon as) a sufficient amount of resin 304 has been delivered to the vat 312 for a single layer, light may be shined on the resin 304 in the vat 312 to form a layer, and the process may repeat until all of the layers have been formed.

The dosing pump 306 may be connected, via a tube 318, to a bottom portion of the vat 312 (e.g., lower than at least a mid-point of the vat 312). The first amount of the resin 304 and the second amount of the resin 304 may be transported to the vat 312 via the tube 318.

If the most recently cured layer was the last layer (510: Yes), then the process may proceed to step 512, where the 3D object may be removed from the build platform and any clean-up process may be processed. The 3D object may be manually removed by a human user. Otherwise, the 3D object may be automatically ejected (e.g., separated by mechanical means) from the build platform. Any uncured resin 304 in the vat 312 may be drained, recycled, and/or reused.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   transporting, into a vat, via a dosing pump, and via an opening at a bottom portion of the vat, a first amount of resin for creating a first layer of a three-dimensional object;
   curing, via an image projector, the first layer of the three-dimensional object over a build platform disposed at a bottom surface of the vat;
   transporting, into the vat, via the dosing pump, and via the opening at the bottom portion of the vat, a second amount of the resin for creating a second layer of the three-dimensional object; and
   curing, on top of the first layer and via the image projector, the second layer of the three-dimensional object.

2. The method of claim 1, wherein the dosing pump is connected, via a tube, to the opening at the bottom portion of the vat, and wherein the first amount of the resin and the second amount of the resin are transported into the vat via the tube.

3. The method of claim 1, further comprising determining the first amount based on at least one of:
dimensions of the vat, or
a thickness of the first layer.

4. The method of claim 1, wherein the transporting the first amount comprises:
initiating the dosing pump to transport the resin into the vat; and
based on receiving, from a sensor, a signal indicating that a height of the resin in the vat has increased by a thickness of the first layer, stopping the dosing pump from transporting the resin into the vat.

5. The method of claim 1, wherein the curing the first layer comprises projecting, via the image projector, light onto a top surface of the resin in the vat.

6. The method of claim 1, wherein the image projector comprises a digital light processing (DLP) imaging device.

7. A method comprising:
causing a dosing pump to initiate, at a time, transporting resin into a bottom portion of a vat;
based on receiving an indication that a level of the resin in the vat has increased by a height of a layer of a three-dimensional object since the time, causing the dosing pump to stop transporting the resin into the vat; and
causing an image projector to cure at least a portion of the resin to create the layer of the three-dimensional object.

8. The method of claim 7, wherein the dosing pump is connected, via a tube, to a bottom portion of the vat, and wherein the resin is transported into the vat via the tube.

9. The method of claim 7, wherein the image projector is configured to project light onto a top surface of the resin in the vat.

10. The method of claim 7, wherein the image projector comprises a digital light processing (DLP) imaging device.

11. The method of claim 7, wherein the vat comprises a build platform disposed on a bottom surface of the vat, and wherein the layer of the three-dimensional object is cured over the build platform.

12. The method of claim 7, wherein the layer is a first layer, the method further comprising:
causing the dosing pump to initiate, at a second time, transporting the resin into the vat;
based on receiving a second indication that the level of the resin in the vat has increased by a height of a second layer of the three-dimensional object since the second time, causing the dosing pump to stop transporting the resin into the vat; and
causing the image projector to cure at least a second portion of the resin to create, on top of the first layer, the second layer of the three-dimensional object.

13. The method of claim 7, wherein the resin comprises a photopolymer, and wherein the image projector is configured to emit ultraviolet light.

14. An apparatus comprising:
a vat comprising:
a build platform, wherein the vat is configured to hold a three-dimensional object being printed over the build platform, and
a bottom portion having an opening;
a dosing pump configured to:
transport, into the vat Andria the opening at the bottom portion of the vat, a first amount of resin for creating first layer of the three-dimensional object;
transport, into the vat and via the opening at the bottom portion of the vat, a second amount of the resin for creating a second layer of the three-dimensional object; and
an image projector configured to:
cure the first layer of the three-dimensional object over the build platform; and
cure, on top of the first layer, the second layer of the three-dimensional object.

15. The apparatus of claim 14, wherein the vat further comprises a bottom surface, and wherein the build platform is disposed at the bottom surface of the vat.

16. The apparatus of claim 14, further comprising a tube that is connected between the dosing pump and a bottom portion of the vat, wherein the dosing pump is configured to transport the resin the vat via the tube.

17. The apparatus of claim 14, further comprising a controller configured to determine the first amount based on at least one of:
dimensions of the vat, or
a thickness of the first layer.

18. The apparatus of claim 14, further comprising:
a sensor; and
a controller configured to:
cause the dosing pump to initiate to transport the resin into the vat; and
based on receiving, from the sensor, a signal indicating that a height of the resin in the vat has increased by a thickness of the first layer, cause the dosing pump to stop transporting the resin into the vat.

19. The apparatus of claim 14, wherein the image projector is further configured to project light onto a top surface of the resin in the vat.

20. The apparatus of claim 14, wherein the image projector comprises a digital light processing (DLP) imaging device.

* * * * *

UNITED STATES PATENT AND TRADEMARK OFFICE
CERTIFICATE OF CORRECTION

PATENT NO. : 11,794,405 B2
APPLICATION NO. : 17/572017
DATED : October 24, 2023
INVENTOR(S) : Tsung-Hsiang Hsueh Page 1 of 1

It is certified that error appears in the above-identified patent and that said Letters Patent is hereby corrected as shown below:

In the Specification

Column 7, Line 21:
Delete "302" and insert --320--

Column 7, Line 67:
Delete "315" and insert --314--

Column 8, Line 30:
Delete "316" and insert --304--

Column 10, Line 24:
Delete "303" and insert --304--

Column 10, Line 25:
Delete "303" and insert --304--

In the Claims

Column 16, Claim 14, Line 14:
Delete "Andria" and insert --and via--

Column 16, Claim 14, Line 15:
After "creating", insert --a--

Column 16, Claim 16, Line 32:
After "resin", insert --into--

Signed and Sealed this
Fifth Day of November, 2024

Katherine Kelly Vidal
*Director of the United States Patent and Trademark Office*